United States Patent [19]

Valliath et al.

[11] Patent Number: 5,745,203
[45] Date of Patent: Apr. 28, 1998

[54] LIQUID CRYSTAL DISPLAY DEVICE INCLUDING MULTIPLE AMBIENT LIGHT ILLUMINATION MODES WITH SWITCHABLE HOLOGRAPHIC OPTICAL ELEMENT

[75] Inventors: George T. Valliath, Buffalo Grove; Kevin W. Jelley, Lagrange Park; Alan G. Chen, Schaumburg; Mark J. Johnson, Cary, all of Ill.

[73] Assignee: Motorola, Inc., Schaumburg, Ill.

[21] Appl. No.: 623,092

[22] Filed: Mar. 28, 1996

[51] Int. Cl.$^6$ .............................. G02F 1/1335; G02F 1/13
[52] U.S. Cl. ................... 349/113; 349/177; 359/15
[58] Field of Search ........................ 349/113, 177; 359/15, 22

[56] References Cited

U.S. PATENT DOCUMENTS

| | | |
|---|---|---|
| 4,984,872 | 1/1991 | Vick . |
| 5,011,244 | 4/1991 | Smith et al. . |
| 5,198,912 | 3/1993 | Ingwall et al. . |
| 5,499,118 | 3/1996 | Wreede et al. ............... 359/12 |
| 5,548,427 | 8/1996 | May ............................ 359/73 |
| 5,663,816 | 9/1997 | Chen et al. ................. 349/113 |

FOREIGN PATENT DOCUMENTS

| | | |
|---|---|---|
| 2-33126 | 2/1990 | Japan . |
| 2-210383 | 8/1990 | Japan . |
| 4-355424 | 9/1992 | Japan . |

OTHER PUBLICATIONS

SID 93 Digest, "Holographic Diffusers for LCD Backlights and Projection Screens," J. M. Tedesco et al. (1993).

Hay et al., "Characterization of Polaroid's DMP-128 Holographic Recording Photopolymer", *SPIE*, vol. 883, (1988), pp. 102–105.

Ingwall et al., "Computer and Optically Generated Holographic Optics," *SPIE*, vol. 1555, (1991), pp. 279–290.

Ingwall et al., "The Mechanism of Hologram Formation in DMP-128 Photopolymer," *SPIE*, vol. 883, (1988), pp. 102–105.

Ingwall et al., "Hologram Recording With a New Polaroid Photopolymer System," *SPIE*, vol. 523, (1985), pp. 306–312.

*Primary Examiner*—William L. Sikes
*Assistant Examiner*—Julie Ngo
*Attorney, Agent, or Firm*—John B. Macintyre; Douglas D. Fekete

[57] ABSTRACT

A liquid crystal display device (10) for forming a display includes a liquid crystal panel (12), a switchable holographic optical element (14), and a reflective holographic optical element (16). Ambient light illuminates a front polarizer (18), which polarizes the ambient light and transmits the polarized light to the liquid crystal cell (20). The liquid crystal cell (20) receives the polarized light and transmits polarized light derived from the incident polarized light to a back polarizer (22). The back polarizer (22) polarizes the light and transmits the light to the switchable holographic optical element (14). While in a first mode, the switchable holographic optical element (14) redirects the light back toward the liquid crystal panel (12) within a first viewing cone (34) to form the display. In a second mode, the switchable holographic optical element (14) is transparent and transmits the light to the reflective holographic optical element (16). The reflective holographic optical element (16) redirects the light back toward the liquid crystal panel (12) in a second viewing cone (36) to form the display. The second viewing cone (36) is preferably narrower than the first viewing cone (34), which increases the intensity of the light within the second viewing cone (36).

14 Claims, 1 Drawing Sheet ously, a holographic reflector is composed of photographic film having regions of differing indices of refraction that cooperate, in a manner similar to a diffraction grating, to redirect light in an interference pattern. In this manner, the interference pattern can be customized for reflecting ambient light into a predetermined viewing cone. Although the interference pattern is predetermined, the nature of the ambient light that illuminates the display device varies. A display device designed for use in a dimly lit environment can incorporate a holographic reflector that concentrates the light into a narrow viewing cone. A display device designed for use in relatively bright ambient lighting situations can incorporate a holographic reflector that redirects ambient light into a wide viewing cone for viewing over a wider range of angles. However, holographic reflectors are preset at the time of fabrication and cannot be varied to adapt for differing ambient light situations.

LIQUID CRYSTAL DISPLAY DEVICE INCLUDING MULTIPLE AMBIENT LIGHT ILLUMINATION MODES WITH SWITCHABLE HOLOGRAPHIC OPTICAL ELEMENT

FIELD OF THE INVENTION

This invention relates generally to a liquid crystal display device that employs multiple reflective holographic optical elements to illuminate the display using ambient light. More particularly, this invention relates to a device that comprises a first holographic optical element having a first viewing mode and a second holographic optical element having a second viewing mode distinct from the first viewing mode.

BACKGROUND OF THE INVENTION

Liquid crystal display devices are known. Liquid crystal display devices are illuminated by ambient light or by backlights that provide a source of light. Liquid crystal displays that use a backlight consume more energy than those that are illuminated solely by ambient light. In liquid crystal display devices that are illuminated by ambient light, reflectors are placed in the back of the displays to reflect ambient light. Conventional reflectors are formed of a reflective material that diffusely reflects light for viewing the display over a wide range of angles.

It has been proposed to utilize reflective holographic optical elements to illuminate liquid crystal display devices. A suitable holographic reflector is composed of photographic film having regions of differing indices of refraction that cooperate, in a manner similar to a diffraction grating, to redirect light in an interference pattern. In this manner, the interference pattern can be customized for reflecting ambient light into a predetermined viewing cone. Although the interference pattern is predetermined, the nature of the ambient light that illuminates the display device varies. A display device designed for use in a dimly lit environment can incorporate a holographic reflector that concentrates the light into a narrow viewing cone. A display device designed for use in relatively bright ambient lighting situations can incorporate a holographic reflector that redirects ambient light into a wide viewing cone for viewing over a wider range of angles. However, holographic reflectors are preset at the time of fabrication and cannot be varied to adapt for differing ambient light situations.

Furthermore, holographic reflectors can be fabricated to respond preferentially to specific kinds of ambient light, such as fluorescent light or incandescent light. This is suitably accomplished by developing the hologram so that the effective spectrum of the interference pattern corresponds to the peak emission characteristics of the light source. However, once the holographic reflector has been developed, the holographic pattern cannot be modified to provide optimal lighting under differing ambient light conditions.

Therefore, a need exists for a liquid crystal display device that utilizes holographic reflectors for illumination by ambient light and that allows the reflection characteristics to be varied for optimal viewing under a variety of ambient lighting conditions.

DETAILED DESCRIPTION OF A PREFERRED EMBODIMENT

Figure 1:
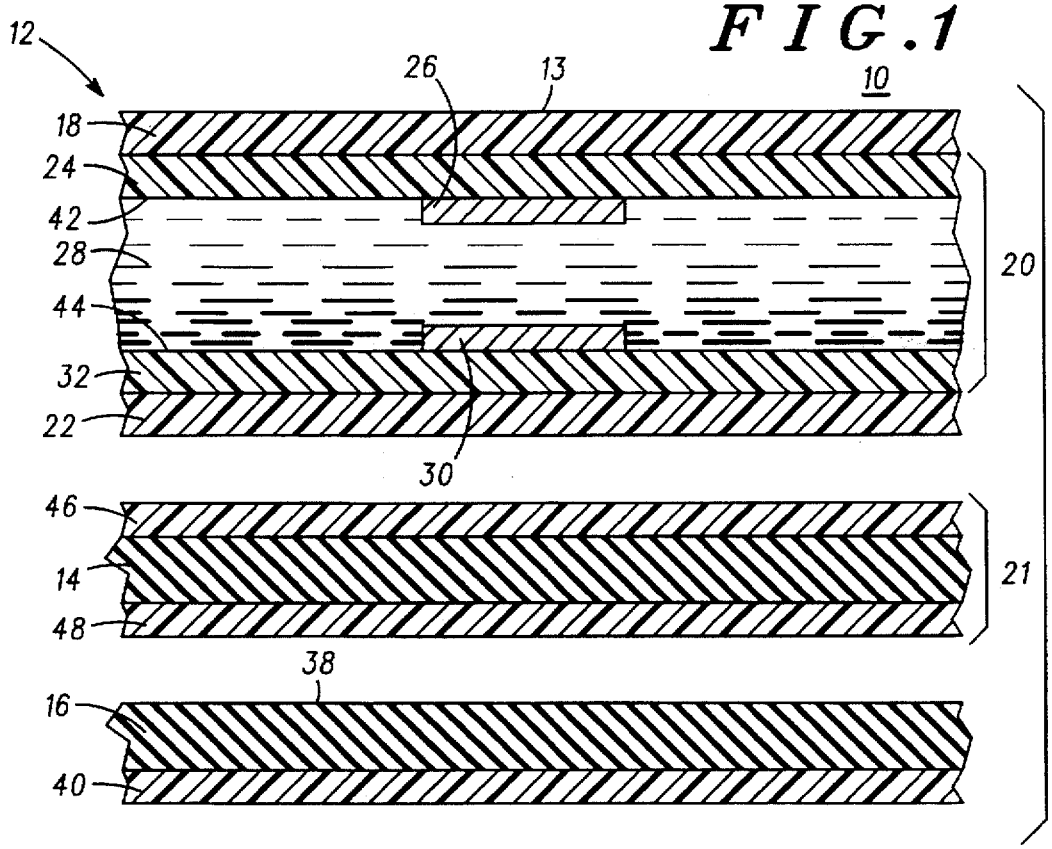
FIG. 1 is a cross-sectional view of a liquid crystal display device in accordance with a preferred embodiment of the present invention.

Referring to FIG. 1, in accordance with a preferred embodiment of the present invention, a liquid crystal display device 10 comprises, as major components, a liquid crystal panel 12, a first holographic optical element 14, and a second holographic optical element 16. First holographic optical element 14 is formed of a switchable holographic optical element that is switchable between a first, reflective mode and a second, transparent mode. The first mode redirects light in a first, predetermined pattern. Second holographic optical element 16 is formed of a reflective holographic optical element that redirects light in a second, predetermined pattern. During use, when element 14 is in the reflective mode, light is redirected to illuminate the display in accordance with the first pattern. However, when first element 14 is switched into the transparent mode, light is transmitted to second element 16 and redirected in accordance with the second pattern. By incorporating multiple holographic optical elements in accordance with this invention, multiple holograms are available to permit an operator to select optimal lighting characteristics for viewing the display under particular lighting conditions.

Display device 10 produces a display that is illuminated by diffuse ambient light and is viewed through front side 13. As used herein, diffuse ambient light refers to lighting, such as found in a room, which tends to irradiate a surface from multiple directions and with varying intensity. The ambient light coming from multiple sources and multiple directions cooperates in illuminating the display for viewing. Different spectral characteristics are associated with different types of ambient light, such as fluorescent light having a peak frequency that is different from the peak frequencies of incandescent light and sunlight. Holographic optical elements are mastered to be effective for light within a predetermined spectral band and can be mastered to redirect light at the peak frequency of fluorescent light, incandescent light, or sunlight.

Liquid crystal panel 12 comprises a front polarizer 18 optically coupled to a liquid crystal cell 20, which, in turn, is optically coupled to a back polarizer 22. Front polarizer 18 is made of a polymeric material and is effective to filter ambient light incident upon front side 13 and to transmit polarized light to liquid crystal cell 20. As used herein, optically coupled refers to elements arranged so that light can pass between the elements in both directions.

Liquid crystal cell 20 is of the type that is readily commercially available and comprises a front plate 24, front electrode 26, liquid crystal layer 28, back electrode 30, and back plate 32. Liquid crystal layer 28 is composed of liquid crystal material. A preferred material is a twisted nematic (TN) liquid crystal compound. Alternately, a super twisted nematic (STN) liquid crystal material may be employed. Layer 28 is sandwiched between front plate 24 and back plate 32. By way of an example of a suitable electrode arrangement, front electrode 26 is affixed to inner surface 42 of front plate 24, adjacent to liquid crystal layer 28. A back electrode 30 is affixed to inner surface 44 of back plate 32, adjacent to liquid crystal layer 28. Front electrode 26 and back electrode 30 cooperate to define a pixel that is switchable between an opaque and a transparent region to form part of the display. Preferably, front electrode 26 and back electrode 30 are formed of a transparent indium-tin oxide material and are connected to an external power supply, not shown.

Back polarizer 22 is composed of a polymeric material similar to front polarizer 18, but has an axis of polarization that is offset at an angle corresponding to the rotation of light transmitted through cell 20. In a typical TN liquid crystal display, the front and back polarizers are linear polarizers whose axes of polarization are offset by ninety degrees. During use, in the absence of an electric field applied between electrodes 26 and 30, light illuminating front side 13 is polarized and transmitted through liquid crystal layer 28. Layer 28 rotates the axis of polarization so that the polarized light passes through back polarizer 22. This light is then available to be reflected back through liquid crystal cell 20 to create a bright region or pixel for the display. In STN cells, the offset angle of the front and back polarizers varies upon the STN cell chosen, but works in the same manner as TN cells to rotate light at bright pixels a predetermined angle. However, an applied electric field between electrodes 26 and 30 disrupt the liquid crystal layer 28 so that the light cannot pass through back polarizer 22. This creates a dark region or pixel for the display.

First holographic optical element 14 is optically coupled to liquid crystal panel 12 for receiving light transmitted through panel 12, and underlies back polarizer 22. In a preferred embodiment, first holographic optical element 14 is a switchable holographic optical element that is switchable between a first, reflective mode that redirects light and a second, transparent mode that transmits light. While operating in the transparent mode, first holographic optical element 14 passes light to second holographic optical element 16, which is optically coupled thereto.

First holographic optical element 14 is preferably formed of a polymer dispersed liquid crystal (PDLC) film sandwiched between two electrodes. The film comprises a photosensitive polymeric matrix and microdroplets of liquid crystal material dispersed within the matrix. The film is formed by exposing a photosensitive polymer to light beams and developing the film to form a matrix comprising voids in accordance with an interference pattern created by the light beams. The voids are then filled with a liquid crystal material. In a preferred embodiment, switchable layer 21 comprises switchable holographic optical element 14 sandwiched between transparent electrodes 46 and 48. Electrodes 46 and 48 cooperate to switch holographic optical element 14 from a first, reflective mode to a second, transparent mode by applying an electric field between electrodes 46 and 48. In the absence of an electric field applied by electrodes 46 and 48, the liquid crystal material has a first index of refraction that is different from the index of refraction of the matrix. In this manner, the liquid crystal material and the voids cooperate to form a hologram that redirects incident light in a first interference pattern. The first interference pattern can be customized to redirect light within a predetermined spectral band. In the absence of an electric field, first holographic optical element 14 acts as a reflective holographic optical element to redirect ambient light to provide illumination for the display. When electrodes 46 and 48 apply an electric field across first holographic optical element 14, the liquid crystal material orients to have a second index of refraction corresponding approximately to the index of refraction of the polymeric matrix.

Consequently, first holographic optical element 14 will be transparent and will transmit light passed from liquid crystal panel 12 to second holographic optical element 16. A suitable switchable holographic optical element is fabricated by infusing liquid crystal material into the polymer matrix of a holographic optical element commercially available from the Polaroid Corporation under the trade designation "Imagix Holographic Reflectors".

When switched to the transparent mode by the applied electric field between electrodes 46 and 48, first holographic optical element 14 is transparent to light transmitted through liquid crystal panel 12. This light is passed through first holographic optical element 14 and is received by second holographic optical element 16. Incorporating a switchable holographic optical element in display device 10 allows multiple holographic optical elements to be incorporated into display device 10. In this manner, distinct interference patterns are suitably incorporated into a single display device to allow the display device to operate in two different modes in response to two separate ambient lighting conditions. This increases the ambient light environments in which the display device may be effectively used.

In a preferred embodiment, second holographic optical element 16 is a volume holographic optical element mounted onto a carrier 40. A suitable second holographic optical element 16 is commercially available from the Polaroid Corporation under the trade designation "Imagix Holographic Reflectors" and includes a layer composed of a photopolymer having the trade designation "DMP-128", which is exposed to laser light and developed to form regions of varying indices of refraction that are effective to redirect light in an interference pattern. Carrier 40 is suitably a reflector effective to reflect excess light that traverses second holographic optical element 16.

Liquid crystal panel 12, switchable layer 21, second holographic optical element 16, and carrier 40 are preferably laminated or otherwise coupled to facilitate handling and to minimize the thickness of display device 10.

Figure 2:
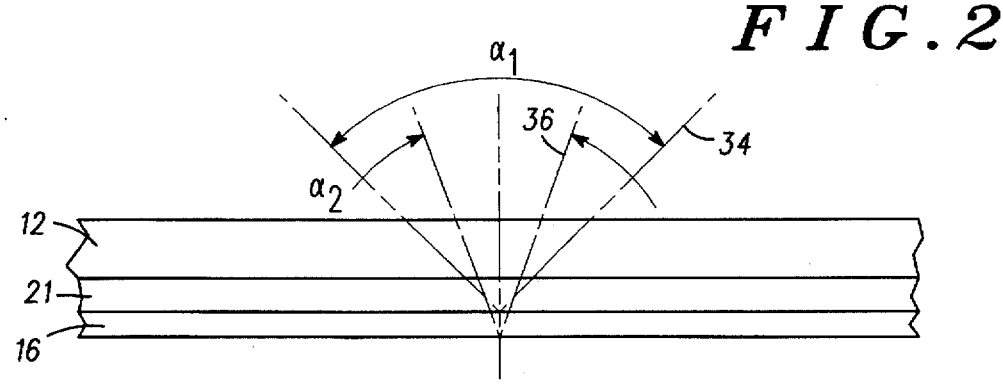
FIG. 2 is a representation of a liquid crystal display device similar to FIG. 1 and showing viewing cones in accordance with one embodiment of the present invention.

As shown in FIG. 2, the light redirected by first holographic optical element 14 when in the reflective mode is directed into first viewing cone 34. In a preferred embodiment, first viewing cone 34 is relatively wide and is effective within a first viewing angle α1. Second viewing cone 36 has a second viewing angle α2, which is preferably narrower than first viewing cone 34. By concentrating the light redirected by switchable layer 21, the light formerly within second viewing cone 36 is intensified. This allows the display to be used in low-light ambient lighting situations, without the power consumption associated when utilizing a backlight element to illuminate the display device. This makes the display usable in situations such as in a dimly lit room or under other low light conditions, without drawing from the limited power of a battery included in the display device.

In an alternate embodiment of the present invention, a switchable holographic optical element is effective to redirect light of a first color into a first viewing cone, and a reflective holographic optical element is effective to redirect light of a second color into a second viewing cone. In another alternate embodiment, a switchable holographic optical element is effective to redirect light of a first type, such as fluorescent lighting, into a first viewing cone, and a reflective holographic optical element is effective to redirect light of a second type, such as incandescent lighting, into a second viewing cone. In this manner, the display device is effective in various ambient light conditions without the need for a backlight element.

In a preferred embodiment, first viewing cone 34 and second viewing cone 36 direct light at an angle that is different from the angle of reflection of incident light upon display device 10. Preferably, the angle of light emitted by switchable holographic optical element 14 and reflective holographic optical element 16 is 20% offset from the specular reflection angle of incident ambient light striking front side 13. By offsetting the light emitted by first hologram 14 and second hologram 16, glare is eliminated and the apparent brightness of the display is significantly increased.

As an example of preferred operation of forming a display, front side 13 of liquid crystal display device 10 is illuminated by ambient light. The ambient light can be fluorescent light, incandescent light, sunlight, or a combination thereof. Front polarizer 18 polarizes the ambient light and transmits polarized light to liquid crystal layer 28. In the absence of an applied electric field, light is then rotated and passed through back polarizer 22 to first holographic optical element 14.

While operating in a first mode, for instance under relatively bright ambient light, first holographic optical element 14 is switched to a reflective mode. First holographic optical element 14 redirects light in a first pattern. By way of an example, first pattern may be first viewing cone 34 in FIG. 2. Light redirected from first holographic optical element 14 is redirected toward liquid crystal panel 12, and traverses back polarizer 22, liquid crystal cell 20, and front polarizer 18 to form the display. When desired by the user, first holographic optical element 14 is electrically switched to a transparent mode by applying an electric field between electrodes 46 and 48. In the transparent mode, light incident upon first holographic optical element 14 is passed to second holographic optical element 16. Reflective holographic optical element 16 is effective to redirect light in a second pattern. A suitable pattern is shown by second viewing cone 36 in FIG. 2, which intensifies the redirected light. Light redirected from second holographic optical element 16 is redirected toward liquid crystal panel 12, and traverses first holographic optical element 14, back polarizer 22, liquid crystal cell 20, and front polarizer 18 to form the display.

In this manner, a display is formed that includes first holographic optical element 14 to redirect light in a wide viewing cone in bright ambient lighting situations and second holographic optical element 16 that redirects light in a narrow viewing cone for use in dimly lit ambient light conditions. When moving from a well-lit ambient light environment to a low-light ambient condition, display device 10 is switched from a first mode that utilizes first holographic optical element 14 to redirect ambient light to provide illumination for the display to second holographic optical element 16 to redirect ambient light to provide illumination for the display.

Figure 3:
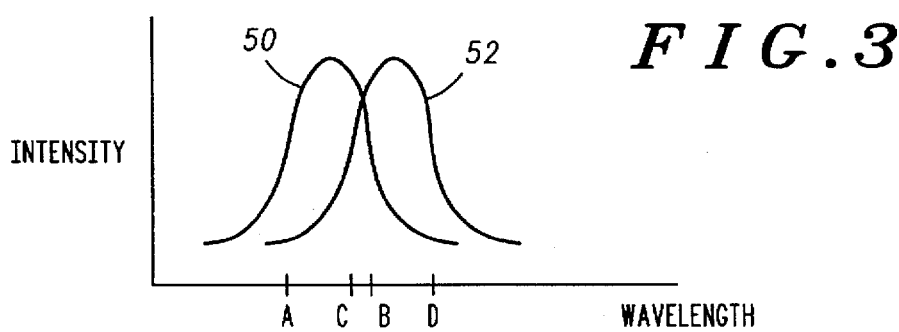
FIG. 3 is a graph showing reflected light intensity as a function of wavelength for a liquid crystal display device in accordance with another embodiment of the present invention.

By way of an alternate embodiment, a device similar to such shown in FIG. 1 is adapted for viewing to include holograms that provide optimal redirection for different types of light. FIG. 3 shows a plot of intensity of reflected light as a function of wavelength of the light transmitted by a first holographic optical element and a second holographic optical element. In one embodiment, the first holographic optical element has a first spectral band 50 that includes a peak intensity matching that of fluorescent light, having a peak at 550 nanometers and a bandwidth of 70 nanometers, from 515 nanometers represented by A to 585 nanometers represented by B. The second holographic optical element has a second spectral band 52 that includes a peak intensity at 590 nanometers and a bandwidth of 70 nanometers, from 555 nanometers represented by C to 625 nanometers represented by D, which is optimal for viewing under incandescent lighting. Thus, for viewing of the display in a room filled with fluorescent lighting, the first holographic optical element is switched to reflect ambient light. However, when in a room filled with incandescent lighting, the first holographic optical element is electrically switched to a transparent mode that transmits light to the second holographic optical element. The second holographic optical element provides optimal viewing under the incandescent lighting conditions. In this manner, the display device can be switched between a first mode that is effective to redirect fluorescent light, and a second mode that is effective to redirect incandescent light.

By way of a third example, the display device can be tailored to produce displays of different colors. The first holographic optical element can be mastered to be responsive to light of a first color, and the second holographic optical element can be mastered to be responsive to light of a second color. In this manner, the display device can be switched between the first mode and the second mode to provide a well-lit, well-contrasted display that is selectable between different color combinations as provided by the first and second holographic optical elements.

The present invention provides a liquid crystal display device that uses ambient light for device illumination. Consequently, the invention consumes less power when illuminated by ambient light than when illuminated by a back light. The liquid crystal display device includes a switchable holographic optical element and a reflective holographic optical element, each being formed to redirect light in a viewing cone specific to the hologram. Thus, it is possible to switch the reflection pattern of the light to provide optimal viewing of the display. In this manner, the reflective holographic optical element is useful to produce a usable display in low-light ambient lighting conditions, without the added power-consumption incurred through use of a backlight in the liquid crystal display. The first holographic optical element can be mastered to effectively redirect fluorescent light and the second holographic optical element can be mastered to effectively redirect incandescent light, thereby creating a display device that is effective in both incandescent and fluorescent lighting environments. In a further embodiment, the first and second holographic optical elements can be mastered to redirect light of different colors, thereby creating a display with increased contrast and color selections. Further, since the angle with which the holographic optical elements redirect light is different from the angle of reflection of incident light, glare is reduced in the display, thereby increasing the apparent brightness of the display.

While this invention has been described by way of an embodiment that comprises a single switchable holographic optical element, a device can be suitably fabricated in accordance with the present invention that comprises two or more switchable holographic optical elements to increase the number of viewing modes for the device. The additional switchable holographic optical elements can be utilized between the liquid crystal cell and the reflective holographic optical element to produce a liquid crystal display device that is effective in multiple ambient lighting conditions. Moreover, the back holographic optical element may be a switchable holographic optical element. The use of a switchable holographic optical element is effective to permit backlighting when combined with a backlight element. This arrangement allows the display device to be used in many ambient lighting situations without the power consumption associated with a backlight, but also to be used with the backlight element in situations where there is insufficient ambient lighting to produce sufficient illumination for the display.

While this invention has been described in terms of certain examples thereof, it is not intended that it be limited to the above description, but rather only to the extent set forth in the claims that follow.

The embodiments of this invention in which an exclusive property or privilege is claimed are defined as follows:

1. A liquid crystal display device for forming a display illuminated by ambient light, said liquid crystal display device comprising:

a liquid crystal panel comprising at least one region having a transparent mode;

a first holographic optical element optically coupled to the liquid crystal panel to receive light transmitted through said region, the first holographic optical element being switchable between a first mode wherein the first holographic optical element forms a first hologram effective to redirect light transmitted through the liquid crystal panel such that the light is redirected back toward the liquid crystal panel, and a second mode wherein the first holographic optical element is transparent to light transmitted through the liquid crystal panel; and a second holographic optical element optically coupled to the first holographic optical element and comprising a second hologram effective to redirect light transmitted through the first holographic optical element back toward the liquid crystal panel.

2. A liquid crystal display device in accordance with claim 1, wherein the first holographic optical element is composed of a polymer dispersed liquid crystal film.

3. A liquid crystal display device in accordance with claim 2, wherein the polymer dispersed liquid crystal film is sandwiched between transparent electrodes and is switchable between the first mode and the second mode in response to an applied electric field generated between the transparent electrodes.

4. A liquid crystal display device in accordance with claim 1, wherein the liquid crystal panel comprises a nematic liquid crystal cell.

5. A liquid crystal display device in accordance with claim 1, wherein the liquid crystal panel comprises a front polarizer and a back polarizer, and wherein the first holographic optical element is optically coupled to the back polarizer.

6. A liquid crystal display device for forming a display illuminated by ambient light, said liquid crystal display device comprising:

a liquid crystal panel comprising at least one region having a transparent mode;

a polymer dispersed liquid crystal film optically coupled to the liquid crystal panel to receive light transmitted through said region, the polymer dispersed liquid crystal film being switchable between a first mode wherein the polymer dispersed liquid crystal film forms a first hologram effective to redirect light transmitted through the liquid crystal panel such that the light is redirected back toward the liquid crystal panel, and a second mode wherein the polymer dispersed liquid crystal film is transparent to light transmitted through the liquid crystal panel; and a reflective holographic optical element optically coupled to the polymer dispersed liquid crystal film and comprising a second hologram effective to redirect light transmitted through the polymer dispersed liquid crystal film back toward the liquid crystal panel.

7. A liquid crystal display device in accordance with claim 6, wherein the polymer dispersed liquid crystal film redirects light in a first viewing cone, and wherein the reflective holographic optical element redirects light in a second viewing cone distinct from the first viewing cone.

8. A liquid crystal display device in accordance with claim 7, wherein the first viewing cone has a first viewing angle and the second viewing cone has a second viewing angle narrower than the first viewing angle.

9. A liquid crystal display device in accordance with claim 6, whereby the light redirected by the polymer dispersed liquid crystal film toward the liquid crystal panel is retransmitted through the liquid crystal panel to form the display.

10. A liquid crystal display device in accordance with claim 6, whereby the light redirected by the reflective holographic optical element toward the liquid crystal panel is retransmitted through the switchable holographic optical element and the liquid crystal panel to form the display.

11. A liquid crystal display device in accordance with claim 6, wherein the polymer dispersed liquid crystal film redirects light of a first color, and wherein the reflective holographic optical element redirects light of a second color distinct from the first color.

12. A liquid crystal display device in accordance with claim 6, wherein the polymer dispersed liquid crystal film redirects fluorescent light, and wherein the reflective holographic optical element redirects incandescent light.

13. A liquid crystal display device in accordance with claim 6, wherein the reflective holographic optical element redirects light toward the liquid crystal panel at a preferential viewing angle different from an angle of reflection of incident light.

14. A liquid crystal display device for forming a display illuminated by ambient light, said liquid crystal display device comprising:

a front polarizer comprising a front side that is illuminated by ambient light;

a liquid crystal cell optically coupled to the front polarizer and comprising at least one region having a transparent mode;

a back polarizer optically coupled to the liquid crystal cell for receiving light transmitted through the liquid crystal cell;

a polymer dispersed liquid crystal film optically coupled to the back polarizer to receive light transmitted through said region, the polymer dispersed liquid crystal film being switchable between a first mode wherein the polymer dispersed liquid crystal film forms a first hologram effective to redirect light transmitted through the liquid crystal cell such that the light is redirected back toward the front side, and a second mode wherein the polymer dispersed liquid crystal film is transparent to light transmitted through the liquid crystal cell; and a reflective holographic optical element optically coupled to the polymer dispersed liquid crystal film and comprising a second hologram effective to redirect light transmitted through the polymer dispersed liquid crystal film back toward the front side.

* * * * *